Figure 1:
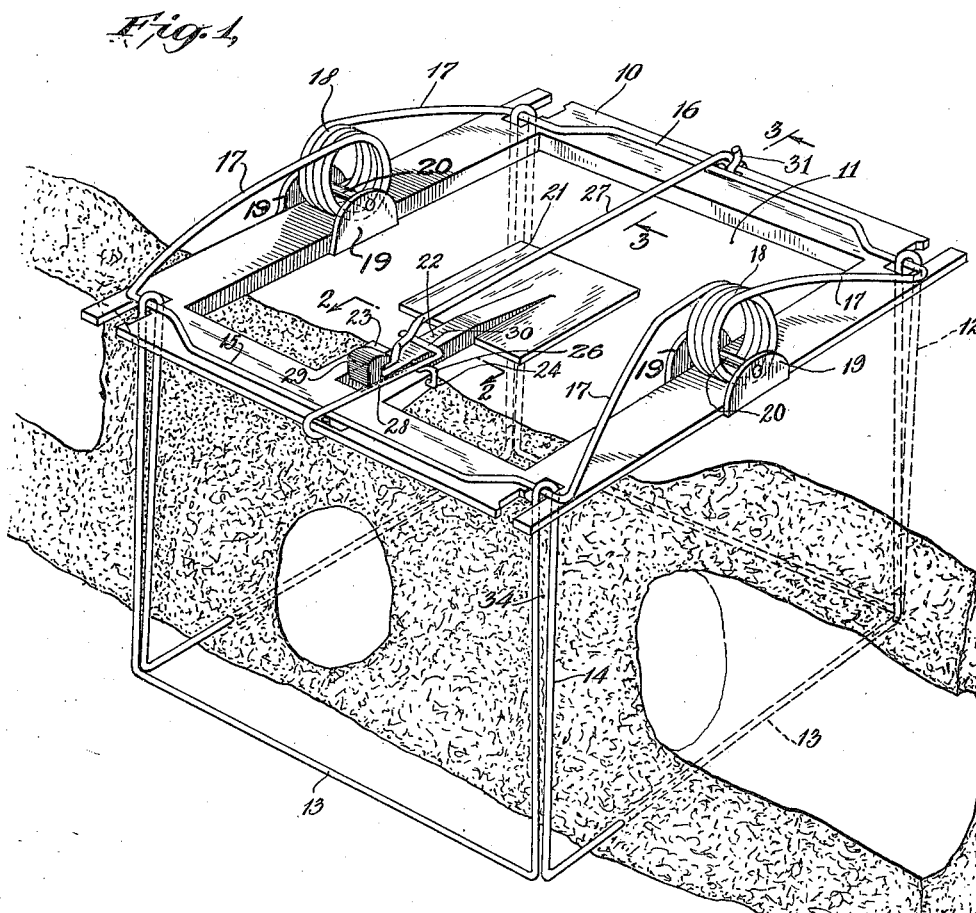

W. W. SMITH.
MOLE TRAP.
APPLICATION FILED JUNE 22, 1921.

1,438,561.

Patented Dec. 12, 1922.
2 SHEETS—SHEET 1.

INVENTOR
WALLACE W. SMITH
BY
Meyers, Cavanagh, Whitehead & Hyde
ATTORNEYS

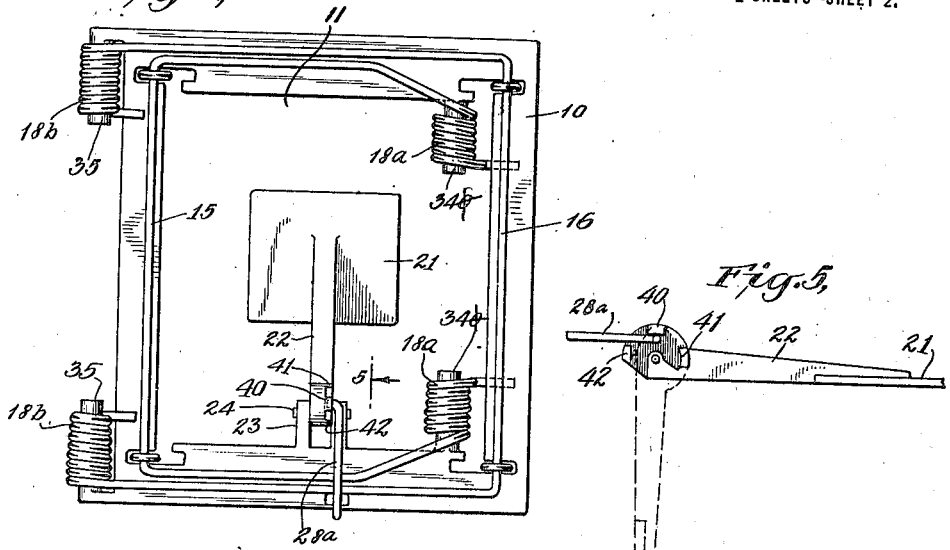
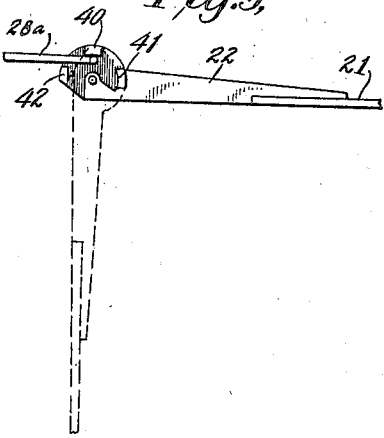
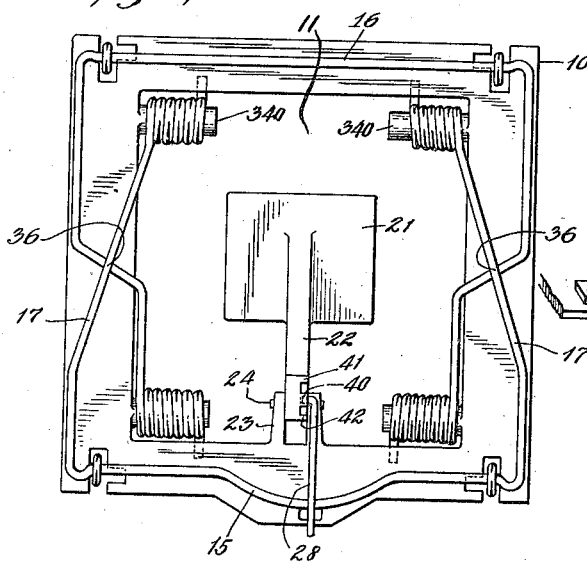
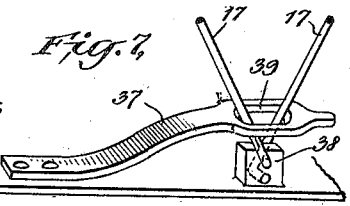

Patented Dec. 12, 1922.

1,438,561

UNITED STATES PATENT OFFICE.

WALLACE W. SMITH, OF PRAIRIE CITY, OREGON.

MOLE TRAP.

Application filed June 22, 1921. Serial No. 479,433.

*To all whom it may concern:*

Be it known that I, WALLACE W. SMITH, a citizen of the United States, and a resident of Prairie City, in the county of Grant and State of Oregon, have invented certain new and useful Improvements in Mole Traps, of which the following is a specification.

My invention relates to traps, and is directed to an improved form of trap especially adapted to catch moles.

My improved trap is of the well-known choker-loop type, the usual form of this trap being provided with a wire loop adapted to be sunk in the ground around a mole tunnel, so that a mole passing through the tunnel will trip the trap.

A principal object of my invention is to provide a trap of the choker-loop type in which a mole coming into the trap from any direction will be caught with equal facility. In the usual trap, as above indicated, moles are caught only when coming from one of two directions, ordinarily defined by the tunnel; and I believe that I am the first to devise a trap adapted to catch moles passing thereunder, regardless of the direction from which they come. My trap is therefore particularly adapted to be located at the intersection of two or more tunnels, thereby increasing its opportunities for catching moles.

In order to set traps of this type accurately and effectively, it is desirable and sometimes necessary to dig away the dirt at the point where the trap is to be set so that the choker-loop may be accurately located in position, the dirt being then replaced and the trigger mechanism set. An important object of my invention is to provide a trap especially adapted for convenient and rapid setting in this manner. More particularly, I have provided a trap having a large open space through which the dirt which has been removed may readily be packed around the choker-loop or loops without interference or obstruction from the trigger mechanism.

An ancillary object is to provide a trap having trigger mechanism which may be temporarily shifted out of position while the trap is being packed with dirt, and which thereafter may be readily set without disturbing the packing. For this purpose I prefer to provide means for temporarily locking the spring members of the trap in operative position while the trap is being packed with dirt, said temporary members being released when the permanent trigger mechanism is set.

Another important feature of my invention is the provision of a trap in which the frame carrying the trigger mechanism may be set flush with the surface of the ground, regardless of whether the choker-loop can be inserted in the ground to its full normal depth. This is especially valuable where the mole tunnel passes over rock or other obstructions, under which circumstances the choker-loop rests on the obstruction and the framework of the ordinary trap is supported above the surface of the ground. Traps sprung under these conditions are very likely to permit the escape of the mole, and obviously are not sprung with the same readiness as a construction such as that devised by me.

I may also embody in my trap several minor improvements which add materially to the effectiveness of the trap under working conditions. These will be apparent from the following detailed description; but several of them accomplish objects of some importance. For one thing, I have provided temporary locking means for the trap spring which is automatically released when the permanent trigger mechanism is set, thereby preventing the user from forgetting to release the temporary lock, thereby rendering the trap useless.

I have also provided means whereby the sensitiveness of the trigger mechanism may be varied to suit different conditions or the taste of the user. The preferred construction disclosed is furthermore particularly adapted for easy setting, as will be set forth hereafter.

While my invention relates chiefly to a mole trap, another object is to provide a trap of this general type which may also be adapted to catch other small animals.

Another and important object is to provide a practical trap having some or all of the above advantages, and which at the same time will be essentially cheap and easy to manufacture, simple in construction and readily made strong enough to withstand long and severe use.

Figure 2:
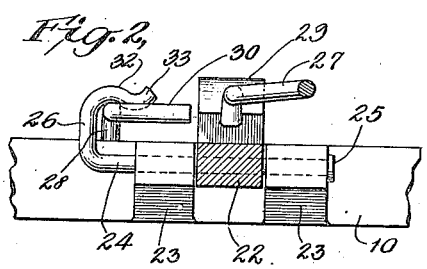
Figure 3:
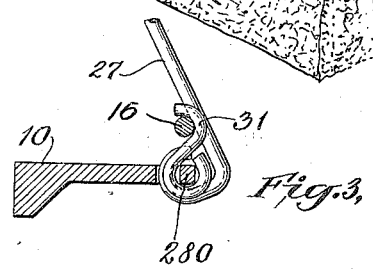

Other objects and advantages of my invention will be apparent from the following description, taken in connection with the accompanying drawings, in which:

Fig. 1 is a perspective view of a preferred form of my trap in set position at the intersection of two mole tunnels, Figs. 2 and 3 are details of the temporary locking mechanism, Fig. 4 is a plan view of a modified form, Fig. 5 is a fragmentary view of a modified type of trigger pan, Fig. 6 is a plan view of another modification, and Fig. 7 is a fragmentary perspective view of a modified form of spring.

The preferred form of trap shown in Fig. 1 includes a frame 10 which may be rectangular in shape and adapted to rest flat on the surface of the ground. For ease in packing the trap with dirt frame 10, regardless of the exact shape thereof, is preferably provided with a substantially open center 11. The choker-loop unit 12 consists of four bottom wires 13 arranged in the form of a rectangle with uprights 14 at each corner of the rectangle each connected to the two adjacent bottom wires 13 and extending upwardly to the frame 10. In the form shown the entire choker-loop unit 12 may be constructed from a single continuous wire in the interests of economy of production, though this feature is not essential.

The upper ends of the choker-loop uprights 14 are engaged by a pair of transverse rods 15 and 16 extending across opposite sides of the frame 10, each of the rods being connected to spring means carried by the frame normally tending to elevate the rods and draw the choker-loop unit 12 upward until the bottom wires 13 are adjacent contiguous portions of the frame 10. Various forms of spring construction and arrangement for this purpose may be employed, several being well known to those skilled in the art. In the preferred form shown in Fig. 1 the ends of rods 15 and 16 are provided with inwardly directed extensions 17 and connected to springs 18 mounted on opposite sides of the frame 10, as by providing said frame with opposed ears 19 connected by pins 20 passing through the springs 18 to hold them in place. In the preferred form shown springs 18, extensions 17 and the rods 15 and 16 may all be formed from a single piece of spring wire, producing a very cheap construction; but this may be varied considerably as hereinafter indicated.

I provide my improved trap with a trigger pan 21 of the usual type located approximately in the center of frame 10 and having a shank 22 pivotally mounted on the frame. A cheap and strong construction for this purpose includes spaced lugs 23 integral with the frame, and a pintle 24 passing through the lugs and through shank 22. For a purpose hereinafter indicated pintle 24, as shown best in Fig. 2, is longitudinally slidable in lugs 23, being provided at one end with a head or other retaining element 25, and at the other end with a hook structure 26, the purpose of which will be hereinafter indicated.

In the preferred form shown in Fig. 1, I employ a separate trigger for each of the rods 15 and 16. The trigger 27 for rod 16 may be formed of stiff wire having an end pivotally mounted on the frame 10 as by looping the end of the trigger loosely about a suitable bar 280 formed on the frame (Fig. 3). The trigger is adapted to extend over bar 16 and across the central portion of the trap, its end extending under the hook 29 formed at the inner end of the shank 22.

The trigger 28 which retains rod 15 in place is pivotally mounted at its outer end on the frame 10 extending inwardly over rod 15 and under trigger 27, the two triggers being suitably contoured so that this engagement may readily be accomplished. One convenient method is to provide trigger 28 with a laterally projecting extension 30 adapted to be located under trigger 27.

The operation of the trap will be apparent, as the parts are so proportioned that trigger pan 21 may be elevated sufficiently by a mole displacing the dirt therebeneath so that hook 29 will be swung outwardly and downwardly to release the end of trigger 27. The upward pressure of rods 15 and 16 on triggers 27 and 28 will swing the latter upwardly and outwardly about their pivots, permitting said rods to spring upwardly, drawing the choker-loop unit 12 up through the soil and catching the mole between one of the bottom rods 13 and the adjacent portion of frame 10, regardless of the direction from which the mole comes.

I preferably construct and arrange the parts so that the dirt may readily be packed about the choker-loop unit 12 through a suitably provided space in frame 10, preferably at the center thereof. With the construction indicated it is necessary to swing trigger 27 and pan 21 out of the way; and for this purpose I provide a temporary means for locking rods 15 and 16 in place. One construction for this purpose is shown in Figs. 1, 2 and 3. For retaining rod 16 I may employ a short hook 31 which may be loosely pivoted about bar 280 of the frame and located to engage rod 16 when in depressed or set position. As shown in Fig. 3, hook 31 when engaging rod 16 preferably is substantially off center, being held in engagement with the rod only by the upward pull thereon of spring 17. With this arrangement, when trigger 27 is set after the trap has been packed with dirt, rod 16 will be depressed by said trigger to a sufficient extent to release hook 31, which will then drop back into inoperative position as shown in Fig. 1, leaving rod 16 free to spring upwardly when the trap is tripped without interference from the hook.

Since trigger 28 is relatively short, I may lock rod 15 in place by providing means for temporarily holding trigger 28 in set position. For this purpose I preferably employ a lug or projection connected to the frame 10 under which trigger 28 may be slipped while the trigger pan 21 and trigger 27 are thrown back during packing of the trap, the trigger 27 being slipped out of engagement with the retaining projection and into position under trigger 27 after the latter has been set. I have found that a cheap and convenient arrangement for this purpose is to form the trigger-retaining projection as a hook extension 32 (Fig. 2) on the end of pintle 24, the parts being so proportioned that when trigger 28 is in engagement with hook 32, the trigger pan 21 is free to be thrown back; and when the extension 30 is swung inwardly under trigger 27, the shank of trigger 28 will entirely clear hook 32. In this manner it will be impossible for a careless operator to leave the temporary retaining means in engagement with trigger 28 when the trap is finally set.

It is sometimes desirable to vary the sensitiveness of the trap; and for this purpose I have provided means which will press upwardly against the trigger mechanism to increase the frictional engagement between trigger 27 and hook 29, thereby increasing the resistance to movement of the trigger pan 21. A highly convenient arrangement for this purpose includes the formation on the end of hook 32 (Fig. 2) of an extension 33 the upper portion of which is preferably indented. When it is desired to increase the stiffness of the trigger mechanism, pintle 24 is rotated until the extension 33 is located below the plane of trigger 28 when the latter is in set position. Extension 33 is then pushed under trigger 28, pintle 24 sliding in its bore, until the depression in the extension is located accurately under the trigger. By swinging extension 33 upwardly and outwardly, it will be wedged under trigger 28, exerting an upward pressure thereon proportionate to the degree to which extension 33 is forced under the trigger. While various other constructions for this purpose may obviously be employed within the scope of my invention, it will be apparent that I have greatly cheapened and strengthened the construction by employing a single element as pintle 24, hook 32 and extension 33.

As above noted, an important feature of my invention is the provision of a trap in which the frame 10 may rest upon the surface of the ground, regardless of the distance below the frame at which the bottom wires 13 of the choker loop unit are located. I accomplish this object by providing the choker-loop unit uprights 14 with vertical slots 34 in which rods 15 and 16 are slidable, this result being readily achieved in the construction shown by slightly spacing the two wires forming the uprights 14; but other constructions are equally suited to this purpose. With this arrangement the trap may be set regardless of how far the upper ends of uprights 14 are located above the set position of rods 15 and 16; and a mole passing into the trap will spring the latter effectively, since the frame is resting flat on the surface of the ground above the mole tunnel.

In Figs. 4 to 7 I have illustrated some of the many modifications of the form shown in Fig. 1 which may be employed within the scope of my invention. In Fig. 4 I have shown the employment of separate springs for each of the rods 15 and 16, the springs 18ª connected to rod 15 being mounted on lugs 34 projecting inwardly from the frame 10 and the springs 18ᵇ connected to rod 16 being mounted on lugs 35 at the outside of the frame. I have also shown a different trigger arrangement, the trigger 28ª engaging extensions 17. While a double trigger arrangement such as is shown in Fig. 1 might be employed with this construction, it is not strictly necessary.

In Fig. 6 I have shown both rods 15 and 16 as mounted on studs 340 projecting inwardly from the frame 10. With this arrangement the extensions 17 cross each other so that the employment of a trigger at 36 for retaining rod 15 in position is adequate, the extension 17 of said rod serving to hold rod 16 and its extensions in set position.

In Fig. 7 I have shown an application of the flat spring 37 to my invention, this type of spring being well known in connection with traps. In this arrangement the extensions 17 at each side of the frame are pivoted in a central lug 38 adjacent the center of the frame, and pass through the usual opening 39 at the end of spring 37. The operation of this construction is apparent.

In Fig. 5 I have illustrated another form of trigger-engaging device mounted on the shank 22 of the trigger pan. In this construction I provide the shank with a laterally projecting lug 40 under which the extension 30 of trigger 28 or 28ª may extend. Lug 40 may be so proportioned that when trigger pan 21 is swung either upwardly or downwardly the trigger 28 will be released. I also may provide a laterally extending lug 41 adapted to engage trigger 28 when the pan 21 is thrown upwardly while the trap is being packed with dirt.

As heretofore indicated, under certain circumstances my trap may also be used to catch gophers, squirrels, rats and other small animals of similar nature. For this purpose it is sometimes desirable to connect bait to the trigger pan 21 in the usual way; and the arrangement shown in Fig. 5 is especially adapted for this purpose, as the trap will be sprung upon disturbance of the bait attached to the pan, whether the bait is pulled down or pushed up. In setting the trap for gophers, the pan may be located across the animal's tunnel, either at the entrance or at a distance therefrom. In the latter case the pan extends downwardly into the tunnel, and preferably is properly baited; it being understood that when used in this way the tunnel is not filled with dirt. When the trap is employed for rats, squirrels or the like, the construction of the pan permits it to be placed in any desired location.

I may also construct my trap so that the trigger pan 21 will be projected downwardly at right angles to the plane of the frame 10 so as to be located across a tunnel or the entrance to a burrow. For this purpose I provide a laterally projecting lug 42 on the shank 22 so that the trigger may be set with the pan in the position indicated in dotted lines in Fig. 5.

While I have described a preferred form of my invention, which has been carefully worked out with the idea of producing a particularly cheap, strong and readily manufactured article, and have indicated certain modifications, it will be apparent that numerous other changes in my preferred construction may be employed within the scope of my invention. Furthermore, my improved trap includes a number of features; and my invention is not limited to the combination of all of these features, but includes them separately, as they may be embodied independently in other types of trap.

I claim:

1. In a subterranean animal trap, the combination with a substantially open frame adapted for ground surface support and for earth replacement through the opening, of a choker-loop unit adapted to be located beneath the surface of the ground and completely surrounding a central zone, and means located at the surface of the ground for drawing said unit upwardly, set in operation by activity of an animal in said central zone.

2. In a subterranean animal trap, a choker-loop unit adapted to be located beneath the surface of the ground and completely surrounding a central zone, means for actuating said unit, and an open-center frame carrying said means and unit adapted to be located on the surface of the ground.

3. In a subterranean animal trap, a substantially rectangular frame with a central opening for earth replacement and adapted to rest on the surface of the ground, trip mechanism carried by the frame, a choker-loop unit extending below the frame and completely surrounding the zone of actuation of said trip mechanism, and means actuated by said mechanism for operating the choker-loop unit.

4. In a subterranean animal trap, a substantially rectangular open frame adapted to rest on the surface of the ground, choker rods normally located beneath said surface in register with the frame and completely surrounding a central zone, uprights carried by said rods, spring means carried by the frame engaging said uprights adapted to draw the rods upwardly through the ground into juxtaposition to the frame, and trip mechanism for operating said means having actuating portions in said zone.

5. In a subterranean animal trap, a choker-loop unit adapted to be located beneath the surface of the ground, comprising a rectangular bottom portion and uprights at the corners of said portion, a frame adapted to rest on the surface of the ground and having portions in vertical register with the bottom portion of the choker-loop unit, a large central portion of said frame being open and unobstructed to permit earth replacement, spring means carried by the frame for operating said unit, and trip mechanism for controlling the operating means having an actuating portion in vertical alignment with the center of said rectangular bottom portion of the choker-loop unit.

6. In a subterranean animal trap, a substantially rectangular choker-loop unit including uprights located at the corners of the choker unit, spring means normally located at the surface of the ground for operating said unit, and a shiftable connection between said uprights and means adapted to permit variations in the relation between said means and unit when the trap is in set position, said connection including means carried by said uprights in which the spring means is longitudinally slidable.

7. In a subterranean animal trap, a substantially rectangular choker-loop unit including uprights located at the corners of the choker unit, spring means normally located at the surface of the ground for operating said unit, and a shiftable connection between said uprights and means adapted to permit variations in the relation between said means and unit when the trap is in set position, said connection including a longitudinal slot in each upright in which the spring means is vertically slidable.

8. In a subterranean animal trap, a choker-loop unit completely surrounding an actuating zone, a frame adapted to be located on the surface of the ground in register with said unit, said frame having a central aperture of substantial extent through which dirt may be packed about said unit, and operating means for said unit carried by the frame.

9. In a subterranean animal trap, a choker-loop unit, a frame having an opening for packing the unit with dirt, spring means carried by the frame for operating the unit, trigger means for controlling the spring means normally extending into the opening when the trap is set, and means for temporarily maintaining the spring means and unit in set position to permit the trigger means to be swung away from the opening during packing.

10. In a subterranean animal trap, a choker-loop unit, a frame having an opening for packing the unit with dirt, spring means carried by the frame for operating the unit, trigger means for controlling the spring means normally extending into the opening when the trap is set, and means for temporarily maintaining the spring means and unit in set position to permit the trigger means to be swung away from the opening during packing, automatically released when the trigger means is set.

Signed at Prairie City, in the county of Grant and State of Oregon, this 10th day of June, A. D. 1921.

WALLACE W. SMITH.